(12) United States Patent
Sammer et al.

(10) Patent No.: US 9,536,213 B2
(45) Date of Patent: Jan. 3, 2017

(54) SYSTEM FOR BUSINESS SUITE AND NETWORK INTEGRATION

(71) Applicants: Lisa Sammer, Eppelheim (DE); Stephan Hetzer, Ostringen-Eichelberg (DE); Volker Wiechers, Neckargemuend (DE); Florian Boehm, Neckarsteinach (DE); Peter Schwarze, Sinsheim Duehren (DE); Igor Wassiljew, Kronau (DE)

(72) Inventors: Lisa Sammer, Eppelheim (DE); Stephan Hetzer, Ostringen-Eichelberg (DE); Volker Wiechers, Neckargemuend (DE); Florian Boehm, Neckarsteinach (DE); Peter Schwarze, Sinsheim Duehren (DE); Igor Wassiljew, Kronau (DE)

(73) Assignee: SAP SE, Walldorf (DE)

( * ) Notice: Subject to any disclaimer, the term of this patent is extended or adjusted under 35 U.S.C. 154(b) by 330 days.

(21) Appl. No.: 14/087,137

(22) Filed: Nov. 22, 2013

(65) Prior Publication Data
US 2015/0106483 A1    Apr. 16, 2015

Related U.S. Application Data

(60) Provisional application No. 61/889,706, filed on Oct. 11, 2013.

(51) Int. Cl.
*G06F 15/177*    (2006.01)
*G06Q 10/06*    (2012.01)
*G06Q 30/00*    (2012.01)
*G06Q 90/00*    (2006.01)

(52) U.S. Cl.
CPC .............. *G06Q 10/06* (2013.01); *G06Q 30/00* (2013.01); *G06Q 90/00* (2013.01)

(58) Field of Classification Search
CPC ...... G06Q 30/00; G06Q 20/102; G06Q 10/06; G06Q 90/00
See application file for complete search history.

(56) References Cited

U.S. PATENT DOCUMENTS

| 8,402,101 | B2 * | 3/2013 | Callaghan | G06Q 10/00 709/206 |
| 2002/0150867 | A1 * | 10/2002 | Sirhall | G09B 5/12 434/118 |
| 2003/0069975 | A1 * | 4/2003 | Abjanic | H04L 63/0428 709/227 |
| 2004/0225751 | A1 * | 11/2004 | Urali | G06Q 30/06 709/246 |
| 2005/0033588 | A1 * | 2/2005 | Ruiz | G06Q 10/06 705/35 |

(Continued)

*Primary Examiner* — Mohamed Wasel
(74) *Attorney, Agent, or Firm* — Schwegman Lundberg & Woessner, P.A.

(57) ABSTRACT

A system includes a suite of business applications and an add-on module coupled to the suite of business applications. The add-on module is configured with Commerce eXtensible Markup Language (cXML) and is operable to enable the suite of business applications to communicate with a network using cXML and a direct web service call to the network. The network is configured to operate using cXML. The direct web service call uses no middleware between the suite of business applications and the network.

17 Claims, 6 Drawing Sheets

(56) References Cited

U.S. PATENT DOCUMENTS

| | | | |
|---|---|---|---|
| 2005/0102500 A1* | 5/2005 | Khangaonkar | H04L 63/0428 713/153 |
| 2005/0144557 A1* | 6/2005 | Li | G06F 17/30896 715/234 |
| 2005/0182768 A1* | 8/2005 | Waldorf | G06Q 10/10 |
| 2006/0133412 A1* | 6/2006 | Callaghan | G06F 9/54 370/465 |
| 2006/0209868 A1* | 9/2006 | Callaghan | G06Q 10/00 370/428 |
| 2012/0102171 A1* | 4/2012 | Bhatt | G06F 9/45533 709/223 |
| 2013/0246996 A1* | 9/2013 | Duggal | G06F 8/35 717/104 |
| 2015/0215376 A1* | 7/2015 | Kranz | H04L 67/10 709/226 |

\* cited by examiner

SYSTEM FOR BUSINESS SUITE AND NETWORK INTEGRATION

CROSS-REFERENCE TO RELATED APPLICATIONS

This application claims the benefit of U.S. Provisional Application No. 61/889,706, filed Oct. 11, 2013, entitled "SAP Business Suite—Ariba Network Integration via direct connectivity," which is incorporated herein by reference in its entirety.

TECHNICAL FIELD

The present disclosure relates to a system for integrating a suite of business applications and a network.

BACKGROUND

At times in the business world, especially after an acquisition of one business organization by another, the information technology (IT) systems of the two organizations must be combined, or at least modified in some way so that the two IT systems can co-exist and preferably communicate. For example, if a first business organization has a vast suite of business applications, and a second business organization has a vast network of users, it would be beneficial to marry the two IT systems together. The organization with the suite of business applications could have a rather large customer base, and the organization with the network could have an extensive hardware and software network, which could be of benefit to the large customer database. In such situations, it is typical to install middleware in connection with a cloud application, and further to use XML, IDOCS, or some other Internet-based language to enable communication between the two IT systems. However, the installation of middleware is not an easy or inexpensive endeavor, and many customers of the suite of business applications may balk at such an upgrade. The art is therefore in need of a simpler and cleaner manner of joining two IT systems.

DETAILED DESCRIPTION

Figure 1:
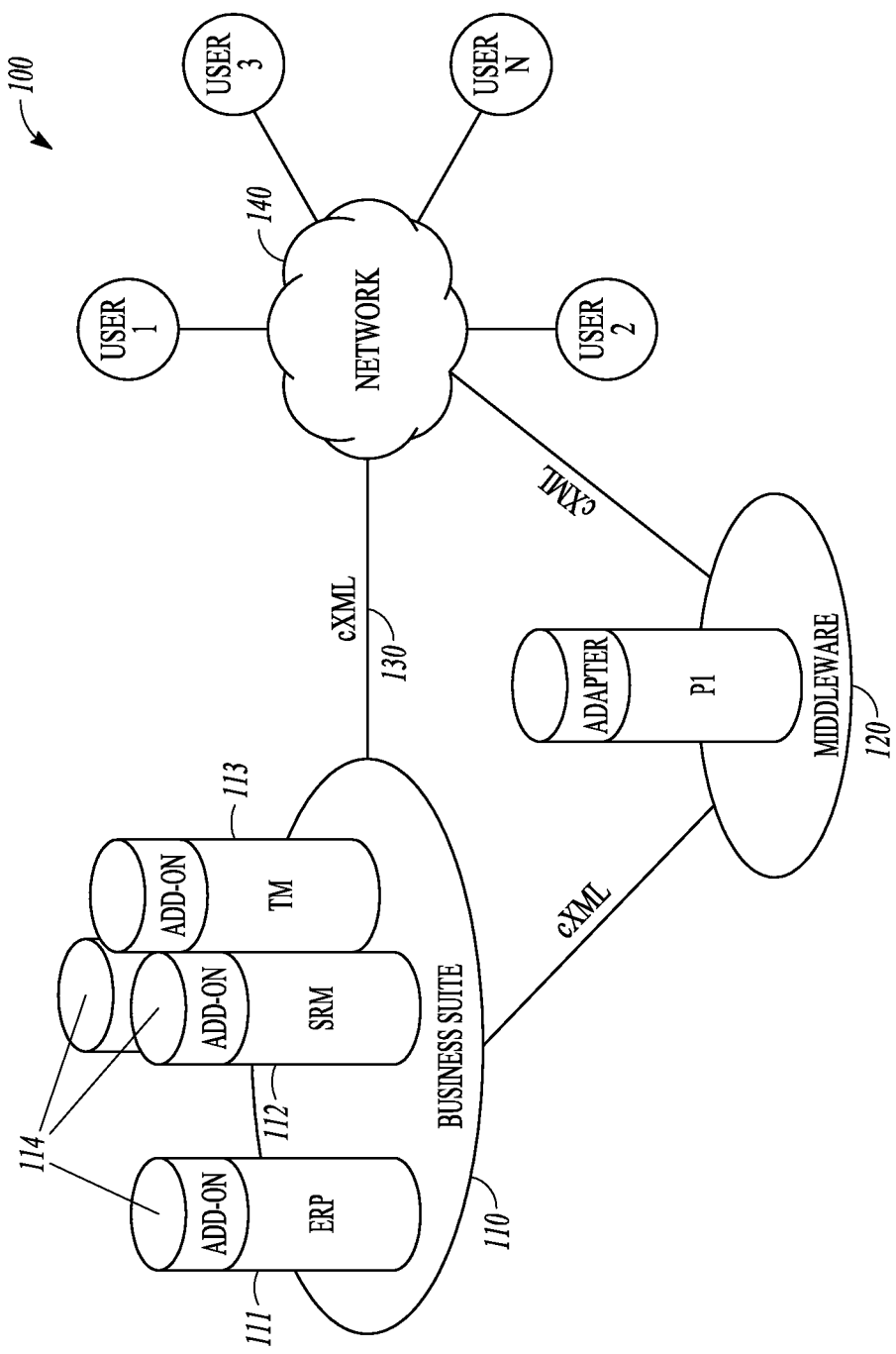
FIG. 1 is a diagram illustrating an embodiment of a business suite system and a network of users.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

After the merger of two business organizations (or the merger of customer transactions and transaction handling between two business organizations) and the need to combine information technology (IT) systems as disclosed above, one or both of the business organizations may want to use the one organization's network in order to expand the numbers of users and transactions, that is, to increase business. An example of such a situation is the merging of SAP's customer database with the Ariba network after the acquisition of Ariba® by SAP®, and the consequent merging of business transactions. This combination could be accomplished by using the customer base of the one business organization and providing an easy integration into the network of the other business organization. To implement such a combination of IT systems, middleware could be used to connect the customers to a cloud application. However, many customers may not have middleware available, and they may not want to install it.

In an embodiment, an add-on compatible with a suite of business applications is provided, and this add-on enables users to connect to a network without any middleware in between the suite of business applications and the network. The system could also support routing of messages and data via a middleware module. The system enables all business suite applications to communicate using Commerce eXtensible Markup Language (cXML). In the SAP/Ariba example, this would entail communicating with cXML, which is the Ariba message format, via a web service call from an SAP-based suite of business applications directly to the Ariba Network. For receiving messages, the add-on to the suite of business applications can actively poll messages from the network, by actively opening a connection from the business application to the network, retrieving the messages, and then closing the connection. This schedulable polling of messages avoids a security risk, currently covered by having middleware in between the business applications and the network. In particular, the business applications on the on-premise system do not involuntarily receive data from the cloud. Rather, the business applications actively request the data.

In an embodiment, such an add-on is independent of the release of new products or upgrades, and the add-on does not require middleware. Notwithstanding, the add-on can support and can work with middleware. As noted, doing away with a requirement of middleware, but supporting the same, can be reached by introducing a new messaging format to the business suite. In an embodiment, this is the Ariba Network's format, that is, cXML. As the outgoing message from the suite of business applications is already generated in the right format, it can be transferred directly to the Ariba Network (which is implemented using cXML). This also applies to messages coming from the network into the suite of business applications. The business suite system can process messages that come in cXML format via the add-on. If it is desired that middleware be included in the connectivity, the message routing can easily be done via the middleware.

The add-on module has several features and functions. The add-on implements reliable inbound and outbound services. The add-on pushes cXML messages to the network, and the add-on's polling agent polls messages from the network. Specifically, the polling agent fetches outstanding cXML messages from the network and pushes them into the inbound service (messages inbound to the business suite of applications).

In an embodiment with a PI on premise (See FIG. 4), the PI is implemented as a two-way stateful mapping for asynchronous in-bound and outbound messages. The cXML messages are pushed to the network. The PI provides the polling agent, and the polling agent fetches outstanding cXML messages from the network, and pushes the cXML messages from the network to the business suite of applications.

FIG. 1 is a diagram illustrating an embodiment 100 of a business suite system and a network of users. A business suite 110 can include, for example, enterprise resource planning (ERP) applications 111, transportation management (TM) applications 113, and supplier relationship management (SRM) applications 112. Each of the ERP applications 111, SRM applications 112, and (TM) applications 113 include an add-on module or processor 114. As noted above, the add-on module 114 permits the applications in the business suite 110 to communicate with the network 140 using cXML 130. As further illustrated in FIG. 1, the business suite 110 can communicate directly with the network 140 using cXML 130, or the business suite 110 can communicate with the network 140 via a PI middleware module 120 (but still using the cXML format).

Figure 2:
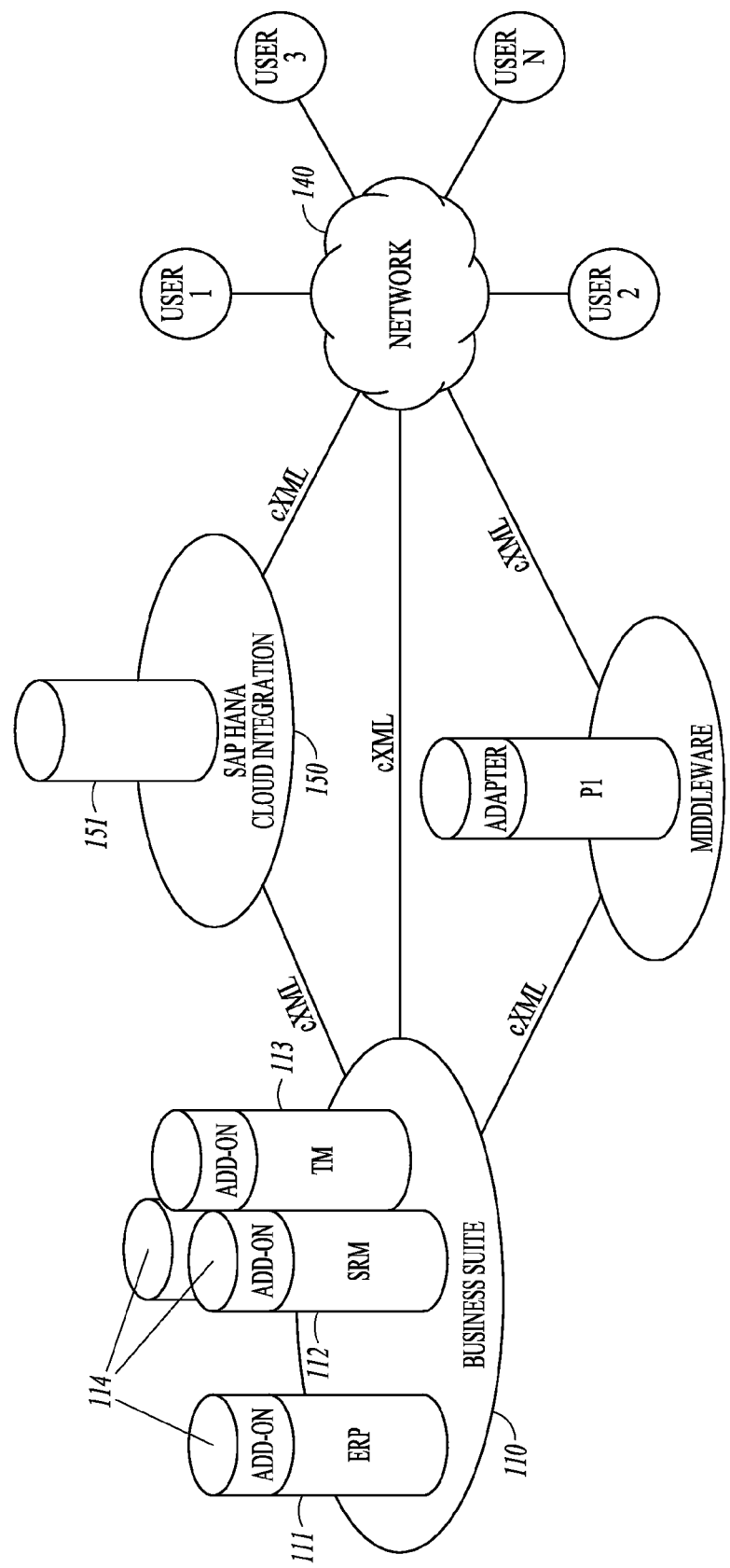
FIG. 2 is a diagram illustrating another embodiment of a business suite system and a network of users.

FIG. 2 is a diagram illustrating another embodiment of a business suite system 110 and a network 140 of users. In FIG. 2, in addition to the business suite 110 being able to communicate with the network 140 via a direct access call to the network or going through a middleware module, the business suite 110 can use a cloud integration module 150, which can include an in-memory database 151. The cloud integration embodiment, like the embodiment of FIG. 1, can also use the cXML format. An example of an in-memory system that could be used is SAP's HANA® in-memory database system.

Figure 3:
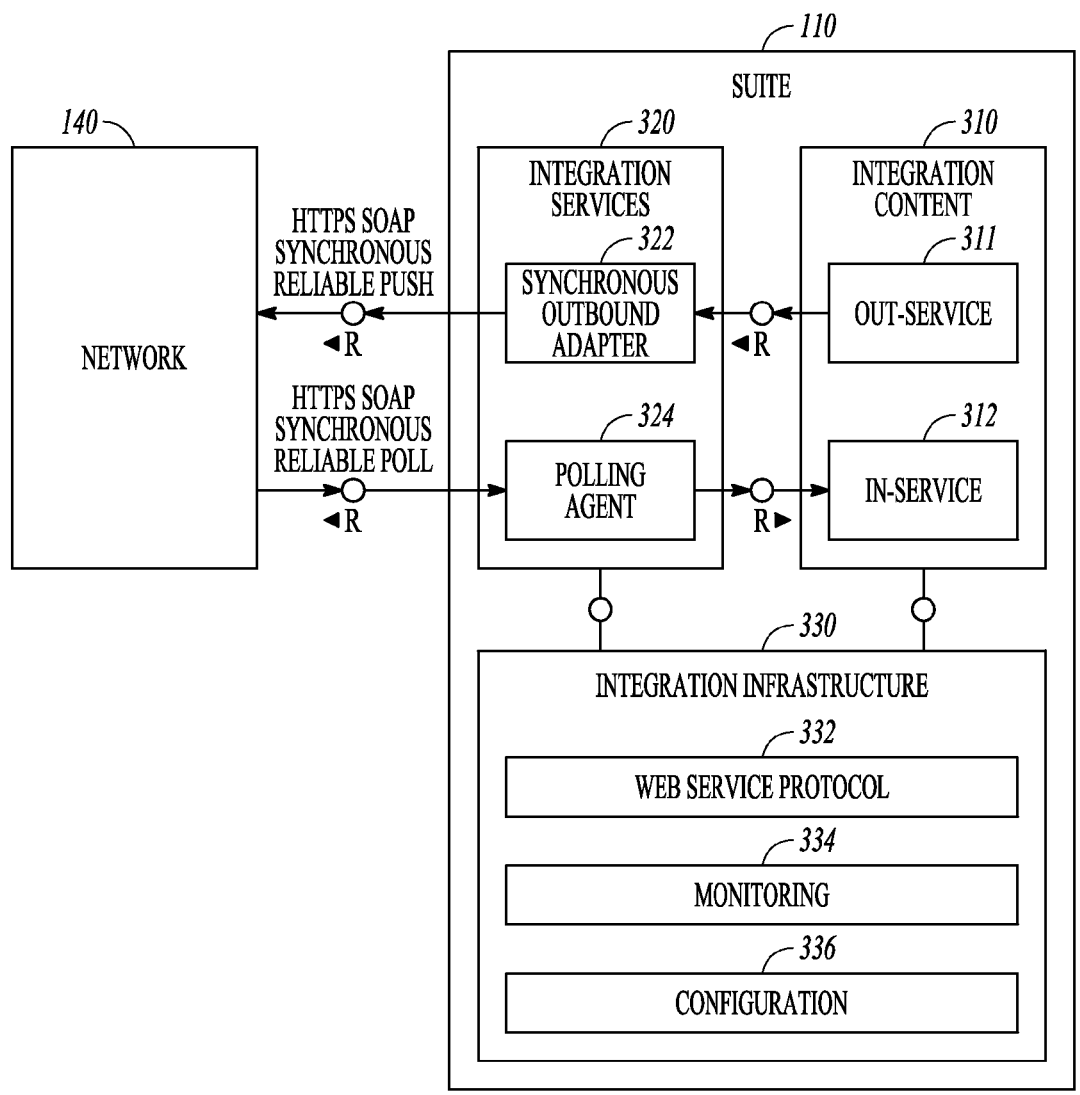
FIG. 3 is a diagram illustrating yet another embodiment of a business suite system and a network of users.

FIG. 3 is a diagram illustrating another embodiment of a business suite system and a network of users. FIG. 3 provides more details of such a system than FIGS. 1 and 2. In FIG. 3, the business suite 110 includes several features. An integration content module 310 includes out-service modules 311 and in-service modules 312. The out-service modules 311 handle messages that are sent from the business suite 110 to the network 140. The out-service modules 311 integrate the outgoing messages into a cXML format. The in-service modules 312 receive cXML formatted messages from the network 140, and translate those messages into one of the formats of an application on the business suite 110. An integration services module 320 includes a synchronous outbound adapter 322 and a polling agent 324. The out-service module 311 transmits its messages through the synchronous outbound adapter 322, which pushes messages to the network 140. The in-service module 312 polls the network 140 for incoming messages. The integration content module 310 and the integration services module 320 leverages the integration infrastructure 330. The integration infrastructure 330 includes, for example, the option to communicate via a web service protocol module 332, a monitoring module 334, and offers configuration possibilities 336.

Figure 4:
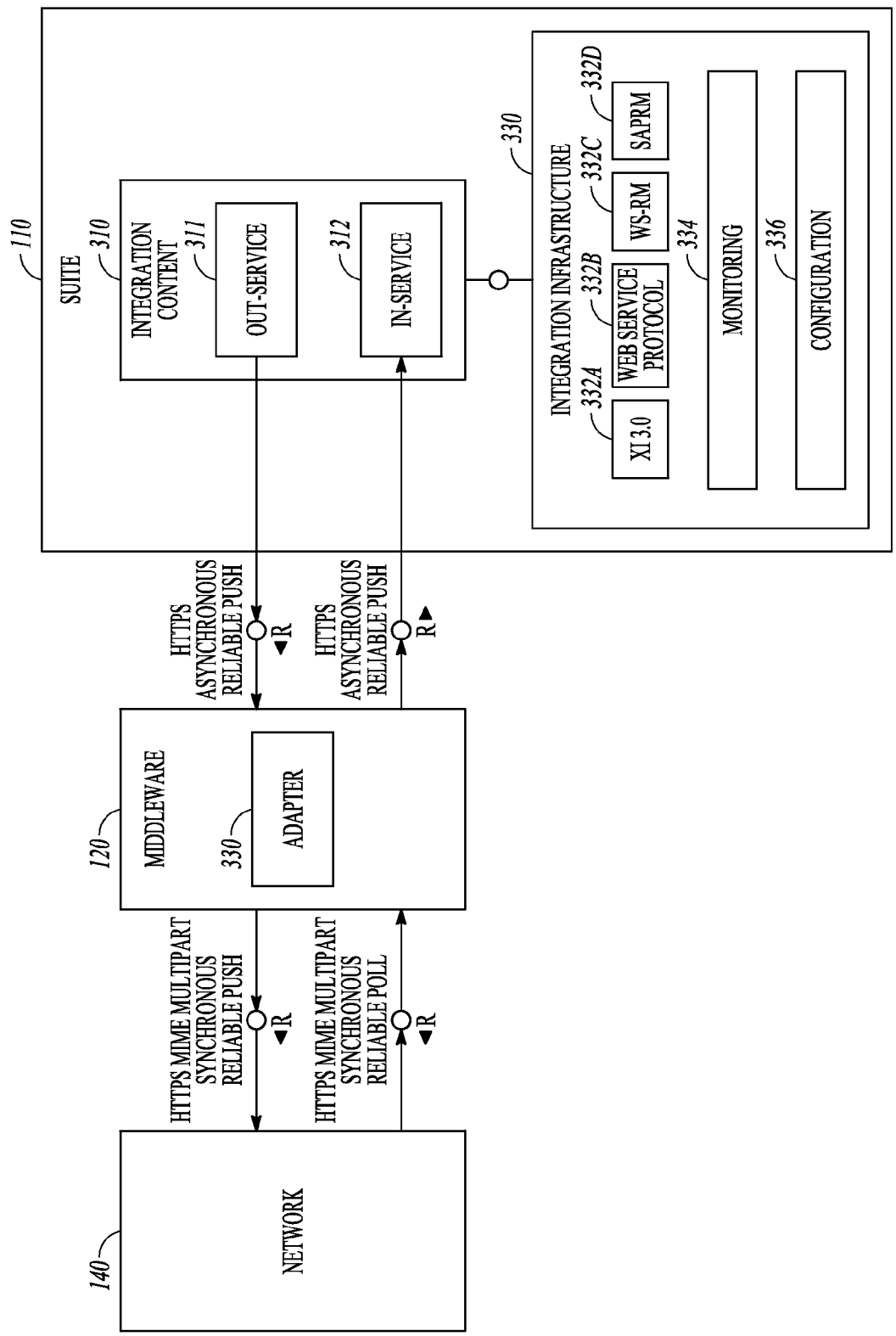
FIG. 4 is a diagram illustrating an embodiment of a business suite system, a network, and a middleware module.

FIG. 4 is a diagram illustrating an embodiment of a business suite system 110, a network 140, and a middleware module 120. The middleware module includes an adapter 330. The suite 110 includes the integration content module 310 and the integration infrastructure 330 like in FIG. 3. The middleware module 120 serves as a conduit in the transfer of messages between the business suite 110 and the network 140. In this embodiment, the middleware module 120 handles the polling from the network 140 via the adapter 330. In addition to the protocol adapter 330, the middleware module further can handle diverse transport protocols, such as XI 3.0 (332A), web service protocol (332B), WS-RM (332C), and SAPRM (332D).

Figure 5:
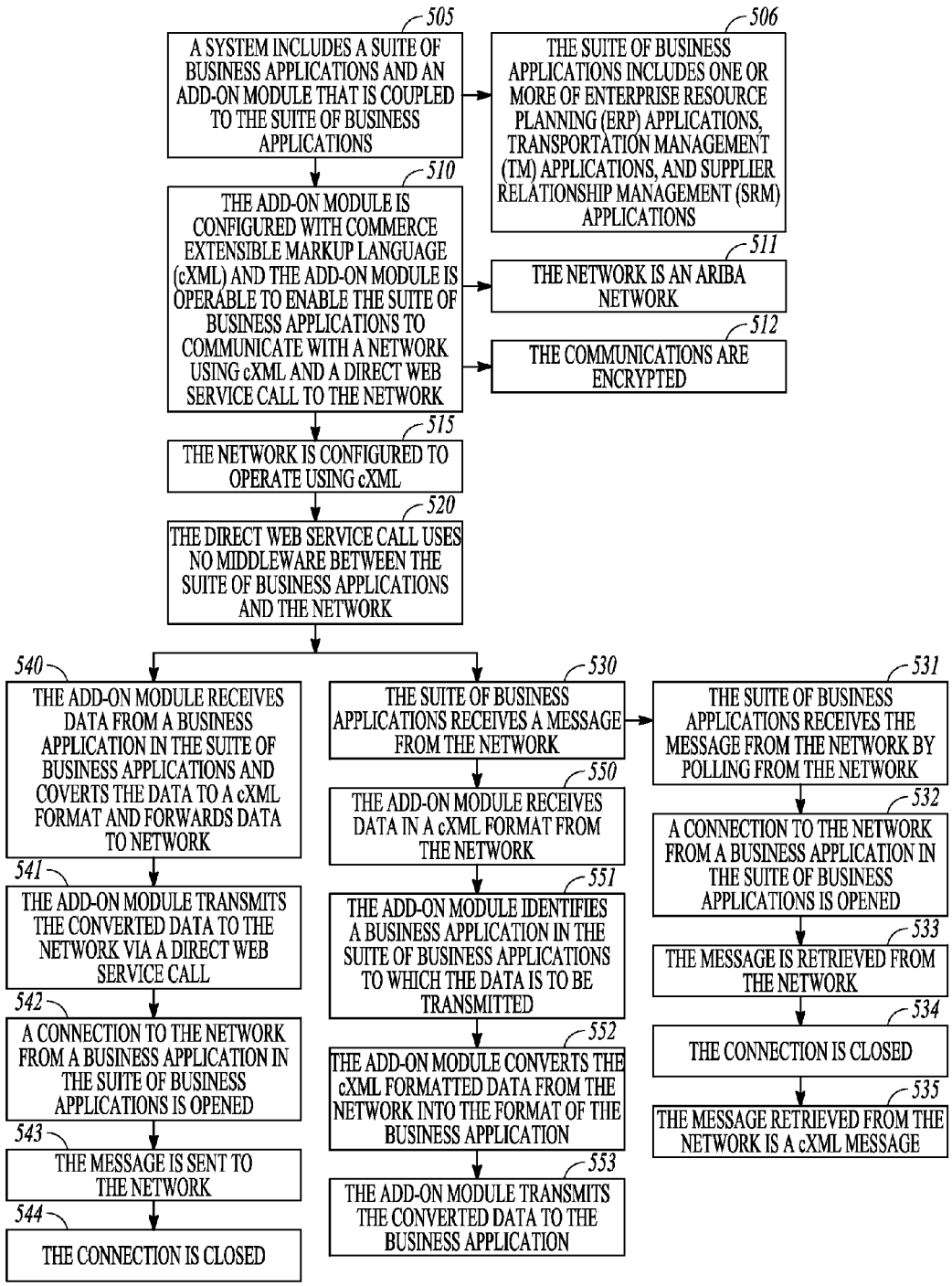
FIG. 5 is a block diagram illustrating operations and features of a system for providing communications between a suite of business applications and a network of users.

FIG. 5 is a flowchart of an example process for managing communications between a suite of business applications and a network. FIG. 5 includes a number of feature blocks and operation blocks 505-553. Though arranged substantially serially in the example of FIG. 5, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 5, at 505, a system includes a suite of business applications and an add-on module that is coupled to the suite of business applications. The suite of business applications can include, for example, one or more of enterprise resource planning (ERP) applications, transportation management (TM) applications, and supplier relationship management (SRM) applications (506). As noted at 510, the add-on module is configured with Commerce eXtensible Markup Language (cXML) and the add-on module is operable to enable the suite of business applications to communicate with a network using cXML and a direct web service call to the network. In an embodiment, the network is an Ariba network (511). In another embodiment, the communications are encrypted (512). As indicated at 515, the network is configured to operate using cXML. As noted at 520, the direct web service call uses no middleware between the suite of business applications and the network. Two execution branches follow operation 520.

Referring to the first execution branch, at 530, the suite of business applications receives a message from the network. The suite of business applications receives the message from the network by polling from the network (531), opening a connection to the network from a business application in the suite of business applications (532), retrieving the message from the network (533), and closing the connection (534). As noted above, the message retrieved from the network is a cXML message (535). At 550, the add-on module receives data in a cXML format from the network. At 551, the add-on module identifies a business application in the suite of business applications to which the data is to be transmitted. At 552, the add-on module converts the cXML formatted data from the network into the format of the business application. At 553, the add-on module transmits the converted data to the business application.

Referring to the second execution branch, at 540, the add-on module receives data from a business application in the suite of business applications, coverts the data to a cXML format, and forwards the data to the network. At 541, the add-on module transmits the converted data to the network via a direct, synchronous web service call. At 542, a connection to the network from a business application in the suite of business applications is opened. At 543, the message is sent to the network. At 544, the connection is closed.

Figure 6:
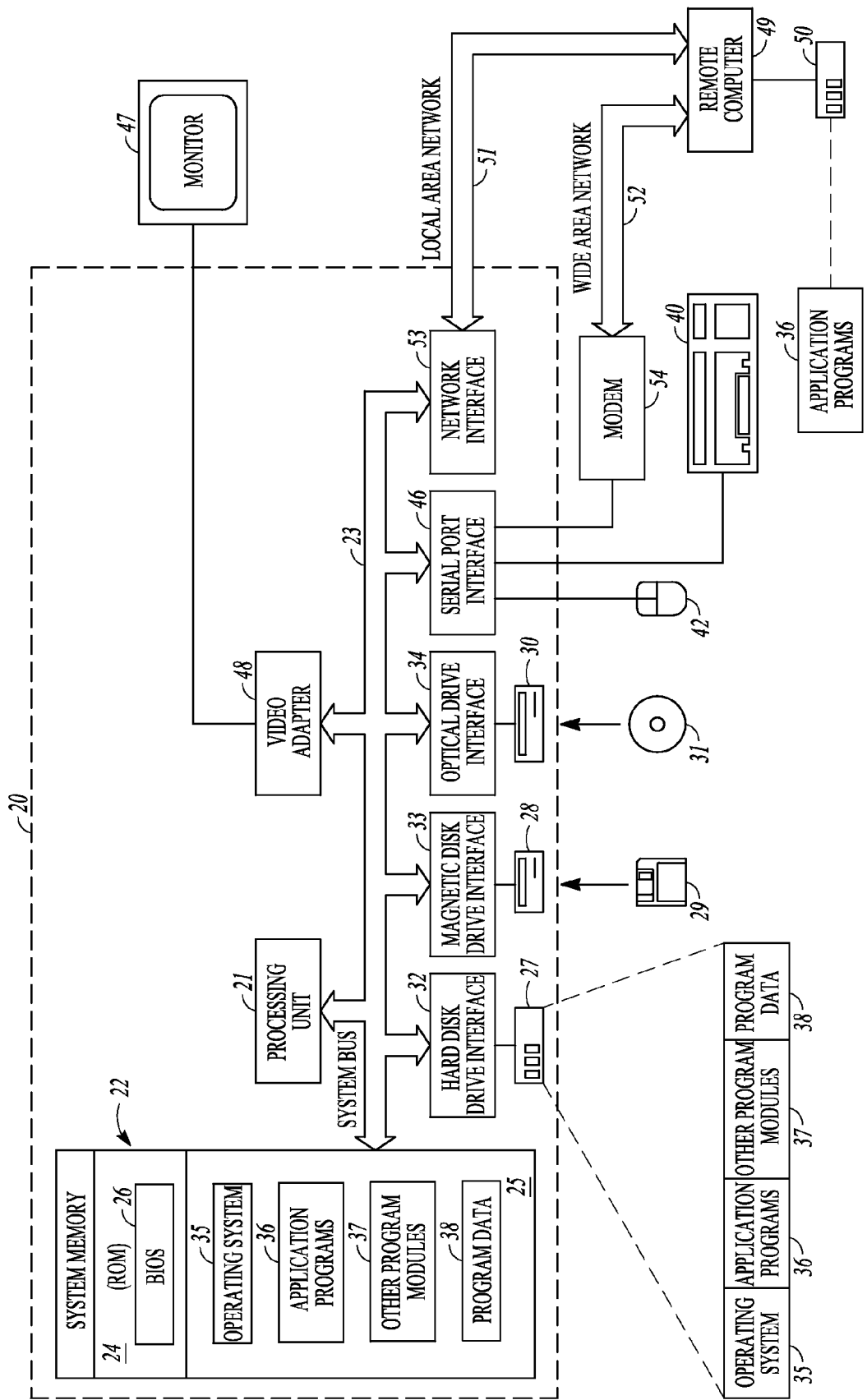
FIG. 6 is a block diagram of a computer system upon which one or more embodiments of the present disclosure can execute.

FIG. 6 is an overview diagram of hardware and an operating environment in conjunction with which embodiments of the invention may be practiced. The description of FIG. 6 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote agents shown in the other Figures.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   a computer processor and a computer storage device configured with:
      a suite of business applications; and
      an add-on processor coupled to the suite of business applications;
   wherein the add-on processor is configured with Commerce eXtensible Markup Language (cXML) and is operable to enable the suite of business applications to communicate with a network using cXML and a direct web service call to the network;
   wherein the network is configured to operate using cXML;
   wherein the direct web service call uses no middleware between the suite of business applications and the network; and
   wherein the computer processor is operable to receive a message from the network so that the business applications do not involuntarily receive data from the network, thereby avoiding a security risk normally handled by middleware, wherein the polling from the network comprises:
      opening a connection to the network from a business application in the suite of business applications:
      retrieving the message from the network; and
      closing the connection.

2. The system of claim 1, wherein the network comprises a business commerce network.

3. The system of claim 1, wherein the suite of business applications comprises enterprise resource planning (ERP) applications, transportation management (TM) applications, and supplier relationship management (SRM) applications.

4. The system of claim 1, wherein the communications between a business application in the suite of business applications and the network are encrypted.

5. The system of claim 1, wherein the add-on processor is configured to receive data from a business application in the suite of business applications and convert the data to a cXML format; and transmit the converted data to the network via the direct web service call.

6. The system of claim 1, wherein the message retrieved from the network comprises a cXML message.

7. The system of claim 1, wherein the add-on processor is configured to:
   receive data in a cXML format from the network;
   identify a business application in the suite of business applications to which the data is to be transmitted;
   convert the cXML formatted data from the network into the format of the business application; and
   transmit the converted data to the business application.

8. A process comprising:
   maintaining a suite of business applications in a computer system;
   maintaining an add-on processor that is coupled to the suite of business applications; and
   transmitting data from the suite of business applications to a network via the add-on processor and a direct web service call using Commerce eXtensible Markup Language (cXML);
   wherein the network is configured to operate using cXML;
   wherein the direct web service call uses no middleware between the suite of business applications and the network; and
   receiving a message from the network by polling the network, so that the business applications do not involuntarily receive data from the network, thereby avoiding a security risk normally handled by middleware, wherein the polling from the network comprises:
      opening a connection to the network from a business application in the suite of business applications;
      retrieving the message from the network; and
      closing the connection.

9. The process of claim 8, wherein the network comprises a business commerce network.

10. The process of claim 8, wherein the suite of business applications comprises enterprise resource planning (ERP) applications, transportation management (TM) applications, and supplier relationship management (SRM) applications.

11. The process of claim 8, wherein the communications between a business application in the suite of business applications and the network are encrypted.

12. The process of claim 8, comprising receiving into the add-on processor data from a business application in the suite of business applications and converting the data to a cXML format; and transmitting the converted data to the network via the direct web service call.

13. The process of claim 8, wherein the message retrieved from the network comprises a cXML message.

14. The process of claim 8, comprising:
   receiving data into the add-on processor module in a cXML format from the network;
   identifying a business application in the suite of business applications to which the data is to be transmitted;
   converting the cXML formatted data from the network into the for of the business application; and
   transmitting the converted data to the business application.

15. A memory device, the memory device communicatively coupled to a processor and comprising instructions which, when performed on the processor, cause the processor to:
   maintain a suite of business applications in a computer system;
   maintain an add-on processor that is coupled to the suite of business applications; and
   transmit data from the suite of business applications to a network via the add-on processor and a direct web service call using Commerce eXtensible Markup Language (cXML);
      wherein the network is configured to operate using cXML;
      wherein the direct web service call uses no middleware between the suite of business applications and the network; and
      wherein the computer processor is operable to receive a message from the network by polling the network, so that the business applications do not involuntarily receive data from the network, thereby avoiding a security risk normally handled by middleware, wherein the polling from the network comprises:
   opening a connection to the network from a business application in the suite of business applications;
   retrieving the message from the network; and
   closing the connection.

16. The memory device of claim 15, comprising instructions to receive into the add-on processor data from a business application in the suite of business applications and convert the data to a cXCL format; and transmit the converted data to the network via the direct web service call.

17. The memory device of claim 15, comprising instructions to:
   receive data into the add-on processor in a cXML format from the network;
   identify a business application in the suite of business applications to which the data is to be transmitted;
   convert the cXML, formatted data from the network into the format of the business application; and
   transmit the converted data to the business application.

* * * * *